United States Patent [19]
Pan et al.

[11] Patent Number: 6,075,311
[45] Date of Patent: Jun. 13, 2000

[54] MICRO-POSITIONED FLATBED

[75] Inventors: Jia-Tian Pan; Neng-Shin Chiu; Shao-Yu Hsu; Horng-Ru Wang, all of Hsinchu, Taiwan

[73] Assignee: Industrial Technology Research Institute, Hsinchu, Taiwan

[21] Appl. No.: 09/119,215

[22] Filed: Jul. 20, 1998

[30] Foreign Application Priority Data

Mar. 12, 1998 [TW] Taiwan .................................. 87203625

[51] Int. Cl.$^7$ .................................................. H01L 41/08
[52] U.S. Cl. ...................................... 310/328; 310/323.02
[58] Field of Search .................................... 310/328, 323, 310/323.02, 323.17

[56] References Cited

U.S. PATENT DOCUMENTS

| | | | |
|---|---|---|---|
| 3,684,904 | 8/1972 | Galutva et al. | 310/328 |
| 4,219,755 | 8/1980 | O'Neill et al. | 310/328 X |
| 4,585,969 | 4/1986 | Tanaka | 310/328 |
| 4,736,131 | 4/1988 | Fujimoto | 310/328 |
| 5,319,257 | 6/1994 | McIntyre | 310/328 |
| 5,786,654 | 7/1998 | Yoshida et al. | 310/328 |

*Primary Examiner*—Mark O. Budd
*Attorney, Agent, or Firm*—W. Wayne Liauh

[57] ABSTRACT

Disclosed is a micro-positioning flatbed comprising a bed; a first driving unit and a second driving unit of resilient construction; a piezo-electric element firmly coupling the first and the second driving units; and piezo-electric elements firmly received within the first and the second driving units, wherein the bed is formed with corresponding, extending guides, the first and the second driving units include opposing sides having configurations corresponding to configurations of the guides, and the first and the second driving units are aligned within the guides of the bed, whereby the piezo-electric elements expand or contract while being subjected to voltages to cause lateral expansion or contraction of the first and the second driving units in response to expansion or construction of the piezo-electric elements firmly received within the first and the second driving units, such that the piezo-electric elements firmly coupled to the first and the second driving units activate the first and the second driving units urge against or release from the guides, so as to produce movement of a minute distance forward or rearward due to expansion or contraction of the piezo-electric elements while being subjected to voltages. This invention may be provided with guides along different axial directions in the bed for receiving multiple sets of the first and second driving units thereby attaining an positioning flatbed of multiple axes for retaining a workpiece positioning flatbed and a tool positioning flatbed so as to conduct machining operations that require micro-positioning. In addition, this invention discloses a driving unit having a special resilient construction that enhances expansion of the driving unit in response of expansion of the piezo-electric element so as to attain precise positioning and movement.

11 Claims, 7 Drawing Sheets

MICRO-POSITIONED FLATBED

FIELD OF INVENTION

This Invention relates to a micro-positioning flatbed, in particular to a first and a second driving units aligned on guides of a bed, wherein the driving units each receive and couple to a piezo-electric element such that each piezo-electric element sequentially generates expending/contracting motions in response to sequential control of magnetic field thereby achieving effects of positioning and micro-motion. This invention also relates to a driving unit having a special resilient construction.

BACKGROUND OF INVENTION

Known art using deformation characteristics of crystal-construction of piezo-electric elements while being subjected to electrical voltages includes U.S. Pat. No. 5,640,065 entitled "Ultrasonic Motor and Method of Driving the Same" and awarded to Abe et al. on Jun. 17, 1997, where the patent discloses an ultrasonic motor comprising a piezo-electric element functioning as a driving source, a rectangular-parallelepipedic elastic body coupled to the piezo-electric element; and a driving circuit for generating a driving signal having attenuation characteristics in a vibration attenuation period of the elastic body, thereby generating an extending/contracting vibration along a longitudinal direction of the elastic body and a bending vibration propagating in the longitudinal direction of the elastic body. The motor is implemented in micro-machining operation and is capable of enhancing positioning precision of a driven object.

Furthermore, prior art using deformation of a piezo-electric element while being subjected to voltages so as to generate driven motions includes an article entitled "Energy Saving Effect of Micro-Lathe" published in "Microengineering and the Global Environment" in November 1996 by Tokio Kitahara, where the article discloses a micro-lathe comprising a mainshaft unit, an X-Y driving unit, and a tool rest. The micro-lathe measures 32.0 mm in length, 25.0 mm in depth, and 30.5 mm in height, and weighs 100 g. The micro-lathe is implemented in cutting miniature parts of several millimeters or less in diameter. The mainshaft unit that consists of a mainshaft and micro-motor is fixed on the X-Y driving unit and is movable in both X- and Y- directions. The lower part of the X-Y driving unit serves as a bed. The tool rest is fixed on one end of the bed. Workpiece is retained in a holder which is integrally constructed with the mainshaft. When cutting, the workpiece is moved to the stationary cutting tool. Rotation of micro-motor transmits to the mainshaft via a rubber belt. The mainshaft speed is variable in approximately 8,000 to 15,000 rpm range. As illustrated in FIG. 8, the X-Y driving unit which comprises two linear driving units 70, 80, can drive the mainshaft unit in the range of 4 mm in both X- and Y- directions. Each linear driving unit 70, 80 comprises a slider 71, 81 and a V-shaped guide device 90 on opposing sides of the linear driving unit 70, 80. A guide 91 located on one side is stationary and another guide 92 is urged by a spring 93 that subjects a lateral thrust. The sliders 71, 81 include piezo-electric elements 72, 82. In operation, voltages are applied to the piezo-electric element 72 within the first linear driving unit 70 to cause lateral expansion. Voltages are then applied to the piezo-electric element 82 within the second linear driving unit 80 to cause longitudinal expansion of the slider 81. Because one end of the slider 81 is blocked by the stationary slider 71 while expansion, the slider 81 may only move and expand forward at a minute distance from the other end. Voltages applied to the first linear driving unit 70 is then removed to cause contraction of the piezo-electric element 72 such that the slider 71 is freely movable on the guide device 90 and the first driving unit 70 is driven to move forward. Voltages applied to the piezo-electric element 82 within the second linear driving unit 80 is then removed to cause contraction of the piezo-electric element 82. However, the sliders 71, 81 are maintained at the aforesaid position due to resilience of the spring 93. The fore-described operations are then repeated to cause the piezo-electric elements 72, 82 to be under control of voltages of accelerated frequency so as to generate expeditious changes of expansion or contraction. The first and second linear driving units 70, 80 thus move forward in minute increments. The first and second linear driving units 70, 80 moving direction is reversed when phase-difference of the voltages being applied to the piezo-electric elements 72, 82.

However, the slider 81 of the second linear driving unit 80 of the aforesaid micro-lathe is only capable of expansion or contraction motions in longitudinal direction without lateral expansion to urge against a guide device 90. When the slider 81 expands as a result of expansion of the piezo-electric element 82, removal of voltages causes the piezo-electric element 72 of the slider 71, thereby subjecting the slider 81 to move a minute distance forward. When the slider 81 moves a distance forward, voltages applied to the piezo-electric element 82 are removed to repeat the aforesaid operation. However, at this moment, contraction of the slider 81 tends to move backwards. Such backward tendency is reduced because the spring 92 urges against the sliders 71, 81, but not completely offset.

SUMMARY OF INVENTION

This invention is designed to overcome the aforesaid backward tendency of the slider 81 and is accomplished by the following measures: the sliders 71, 81 are each firmly coupled to a piezo-electric element 72, 82 that solely serves to urge against the sliders 71, 81 in lateral direction. The sliders 71, 81 are further firmly coupled with a piezo-electric element therebetween that solely serves to urge against the sliders 71, 81 in longitudinal direction, whereby motions of the sliders 71, 81 are precisely controlled because both sliders 71, 81 are featured with means to urge against the guide 90 in lateral direction.

It is therefore an object of this invention to provide a micro-positioning flatbed comprising a piezo-electric element firmly couples between a first and a second driving unit having resilience, and piezo-electric elements each received in and coupled to the first and second driving units, whereby the first and second driving units are each featured with means to urge against guides in lateral direction so as to precisely control positioning and motions in longitudinal direction.

It is another object of this invention to provide a micro-positioning flatbed comprising guides along different axial directions within a bed so as to receive multiple sets of the first and second driving units thereby attaining an positioning flatbed of multiple axes for retaining a workpiece positioning flatbed and a tool positioning flatbed so as to conduct machining operations that require micro-positioning.

It is a further object of this invention to provide a micro-positioning flatbed comprising a driving unit having a special resilient construction that enhances motions of the driving units in response to piezo-electric elements so as to facilitate positioning motion of the positioning flatbed.

DESCRIPTIONS OF PREFERRED EMBODIMENT

BRIEF DESCRIPTION OF DRAWINGS

The constructions and functions of this invention are described in detailed in accompany with the following drawings, wherein:

As illustrated in FIGS. 1 and 2, the micro-positioning flatbed of this invention comprises a bed 10; a first and a second driving units 20, 30 that are freely movable in the bed 10 and aligned in longitudinal direction; a piezo-electric element 22 firmly coupling the first and the second driving units 20, 30; and piezo-electric elements 21, 31 firmly received within the first and the second driving units 20, 30, respectively. The bed 10 includes a housing 11 that is formed with a first cavity-shaped positioning groove 14 along a longitudinal direction thereof, the positioning groove 14 having two opposing walls being formed with V-shaped guides 12 along a longitudinal cross-section thereof. The positioning groove 14 is formed with an opening 142 on a side of the housing 11 of the bed 10 for successively receiving the first and the second driving units 20, 30 therein. The positioning groove 14 is partially formed with an opening 141 on top of the housing 11 of the bed 10 for a workpiece (not shown) to be threaded to the first driving unit 20 via workpiece positioning openings 201. The first driving unit 20 is a resilient body being formed with a penetrating chamber 211 having appropriate dimensions in length and in width for being adhered to and receiving a piezo-electric element 21 having identical dimensions. The first driving unit 20 includes opposing sides being formed with a V-shaped configuration along a lateral cross-section thereof that complements configuration of guides 12 within the positioning groove 14 whereby the first driving unit 20 is slidable along the guides 12. When applying a voltage to the piezo-electric element 21, the piezo-electric element 21 expands in response to magnetic activation. On the other hand, the piezo-electric element 21 contracts upon removal of the voltage. In other words, expansion and contraction of the piezo-electric element 21 cause expansion and contraction of the first driving unit 20. Similarly, the second driving unit 30 is a resilient body. The second driving unit 20 includes an end proximate the first driving unit 20 being firmly adhered to the piezo-electric element 22 and an end distant from the first driving unit 20 being formed with a chamber 311 for being adhered to and receiving a piezo-electric element 31 of identical dimensions. The second driving unit 30 includes opposing sides being formed with a V-shaped configuration along a lateral cross-section thereof that complements configuration of guides 12 within the positioning groove 14 whereby the second driving unit 30 is slidable along the guides 12.

The operations of the first and the second driving units 20, 30 are described as follows. FIG. 5 is an assembled perspective view of the first and the second driving units 20, 30 after being adhered and coupled to the piezo-electric elements 21, 22, 31. FIG. 6 illustrates sequential, operational schematic view of the first and the second driving units 20, 30 moving towards direction of the arrow in response to alternate expansion and contraction.

Figure 6:
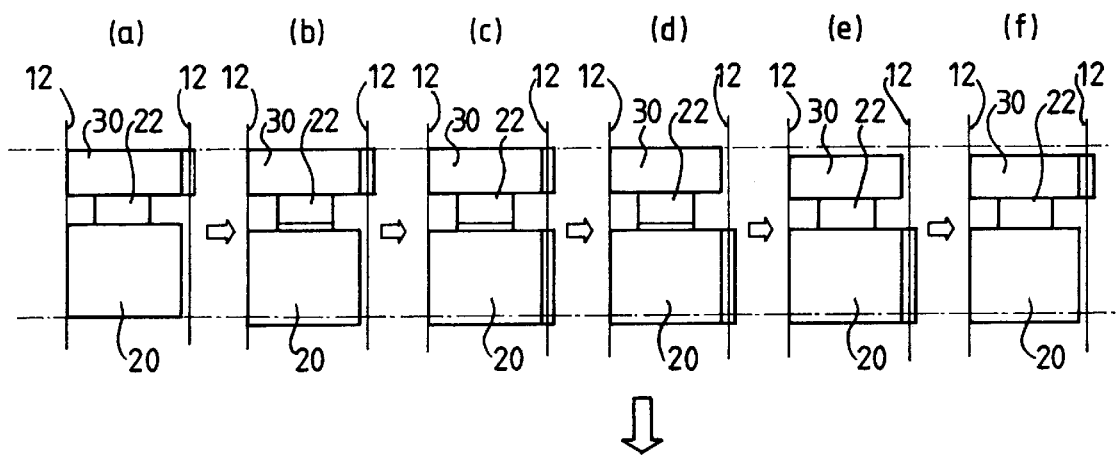
FIG. 6 is a sequential, operational schematic view of a micro-positioning flatbed of this invention, illustrating the first and second driving units and the alternate expansion and contraction motions of the piezo-electric elements coupling the two devices.

Basically, this invention generates sequential changes in lateral expansion or contraction by controlling the piezo-electric elements 21, 31 so as to activate sides of the first driving unit 20 and the second driving unit 30 to urge against the guides 12 of the bed 10. The piezo-electric element 22 further causes expansion or contraction in longitudinal direction in response to applied voltages. In sequence (a) of FIG. 6, the piezo-electric element 31 expands to subject the second driving unit 30 urging against the guides 12. Sequence (b) of FIG. 6 illustrates expansion of the piezo-electric element 22; because the second driving unit 30 urges against the guides 12 and is thus unmovable, the piezo-electric element 22 merely pushes the first driving unit 20 to move a distance towards direction of the arrow. In sequence (c) of FIG. 6, the piezo-electric element 21 expands to cause lateral expansion of the first driving unit 20 and to subject the first driving unit urging against the guides 12. In sequence (d) of FIG. 6, the piezo-electric element 31 contracts due to removal of voltages being applied thereto to subject contraction of the second driving unit 30. In sequence (e) of FIG. 6, removal of voltages being applied to the piezo-electric element 22 causes the second driving unit 30 to move a distance towards direction of the arrow, where the first driving unit is not effected by contraction of the piezo-electric element 22 because it is still under expansion and urges against the guides 12. Sequence (f) of FIG. 6 illustrates the second driving unit 30 repeating operation of sequence (a) to expand and urge against the guides 12 upon removal of voltages being applied to the piezo-electric element 21, hat causes contraction of the piezo-electric element 21. Repetition of sequences (a) to (e) that control piezo-electric elements 21, 22, 33 subjects the first and the second driving units 20, 30 to move toward direction of the arrow. Frequency of voltages are changed to adjust speed of movement. The first and second driving units 20, 30 move in reverse direction of the arrow by reversing sequences (a) to (e).

Figure 1:
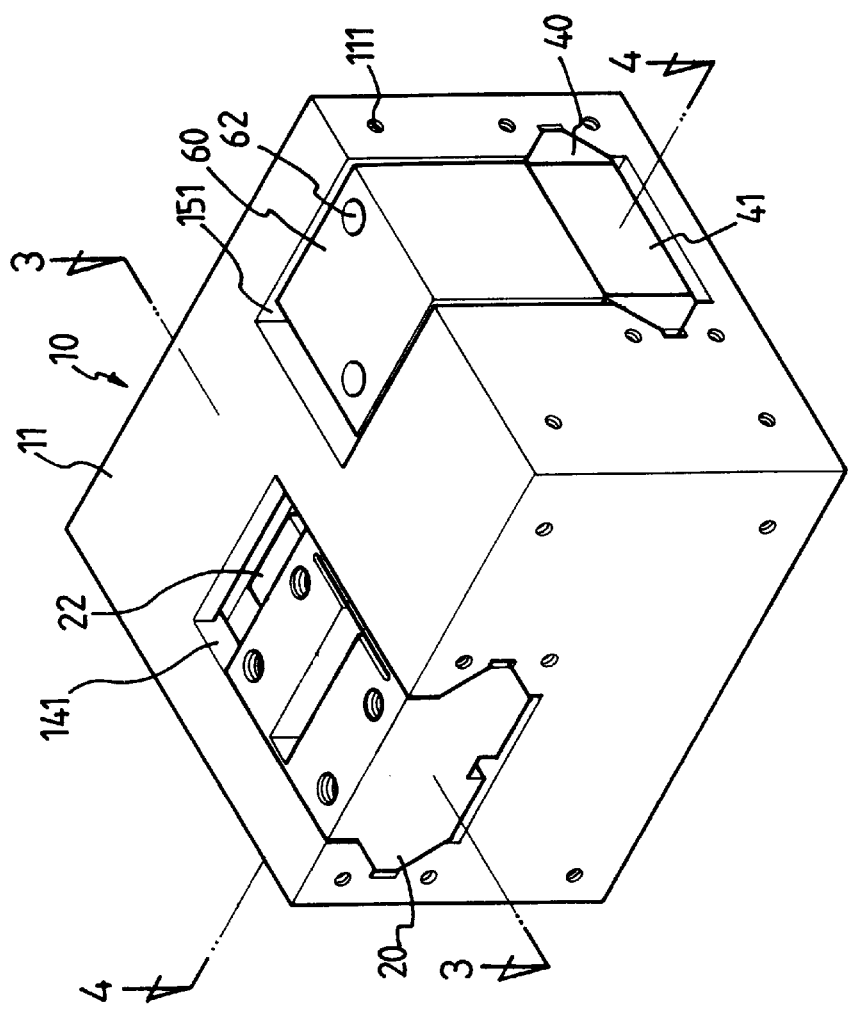
FIG. 1 is an assembled perspective view illustrating two sets of micro-positioning flatbeds of this invention being assembled to different axes of a bed so as to attain a machining bed featured with micro-positioning function.
Figure 2:
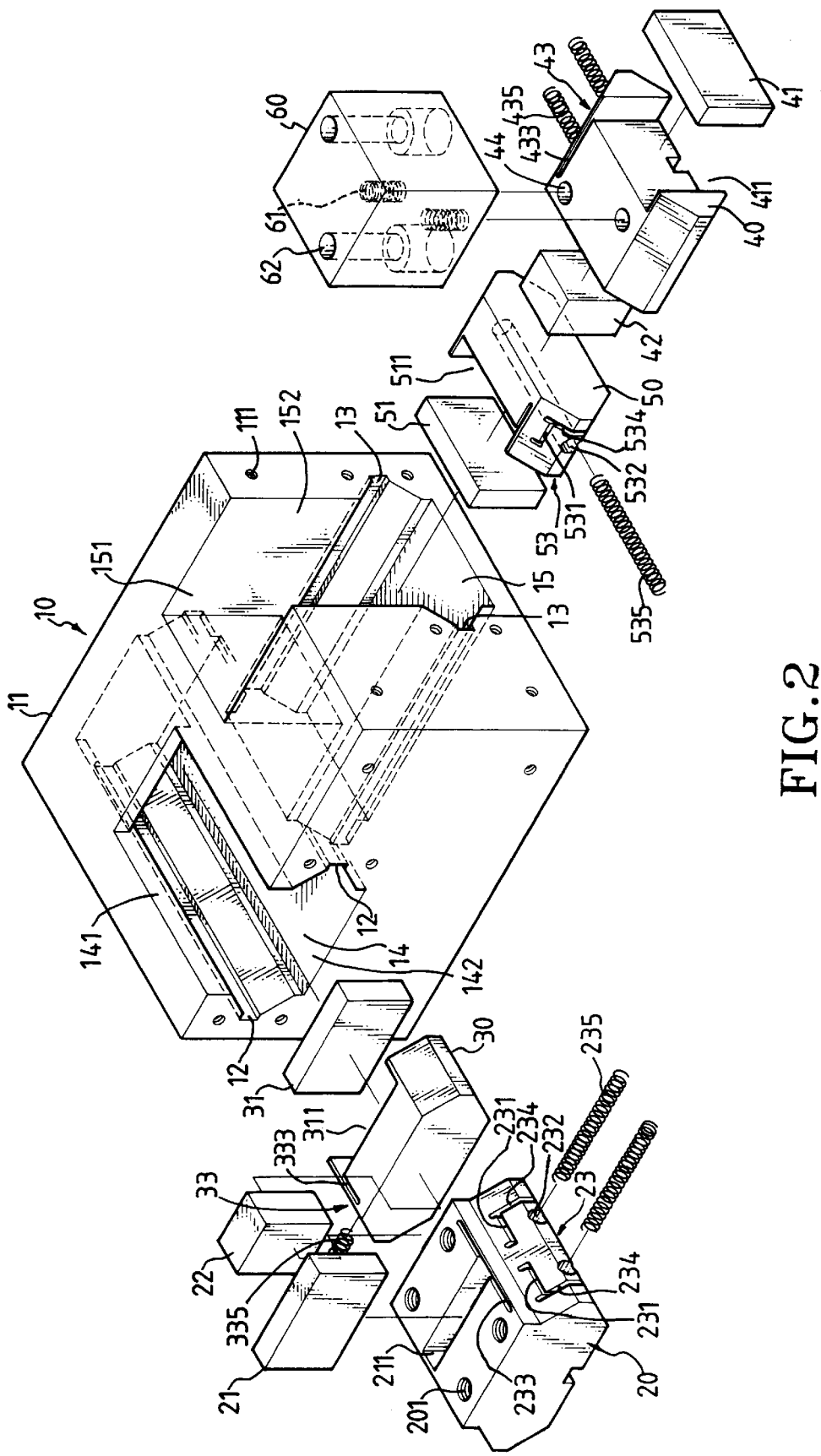
FIG. 2 is an exploded perspective view of FIG. 1.
Figure 3:
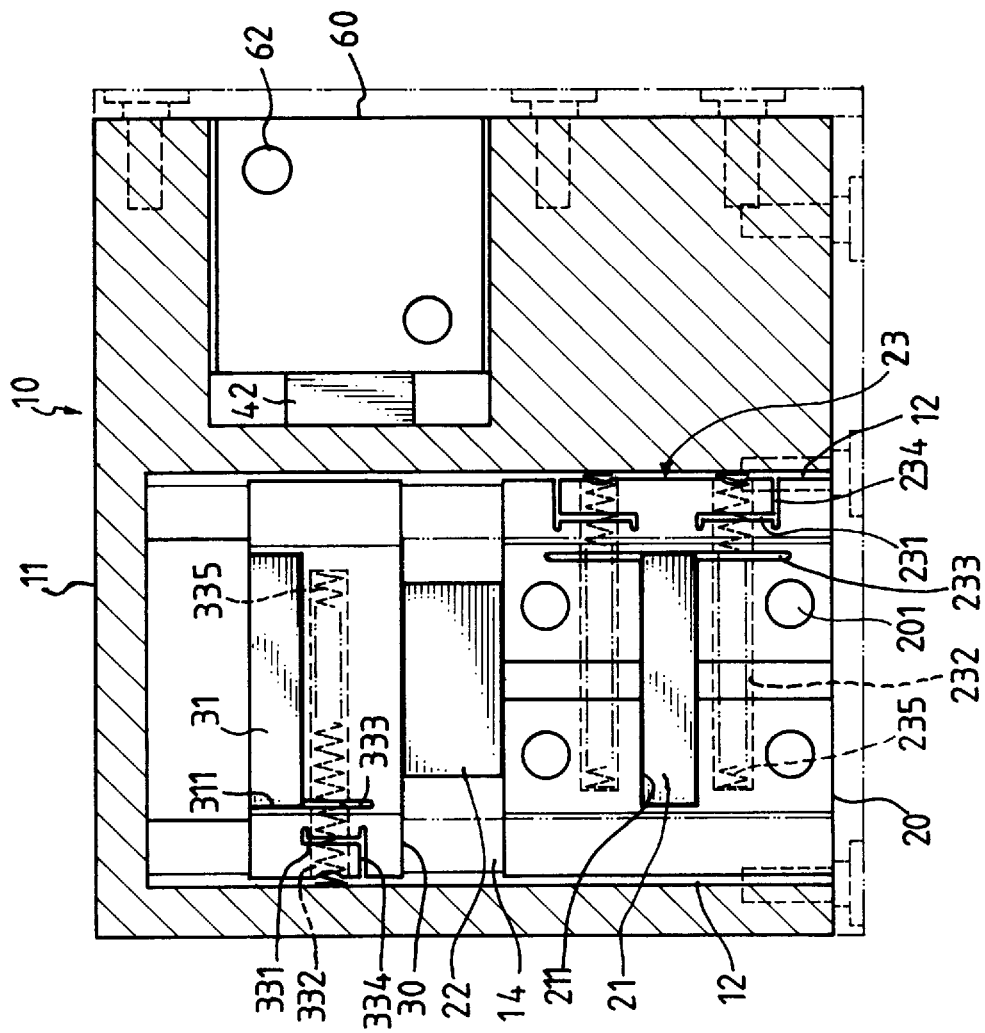
FIG. 3 is a cross-sectional view taken along lines 3—3 of FIG. 1.
Figure 4:
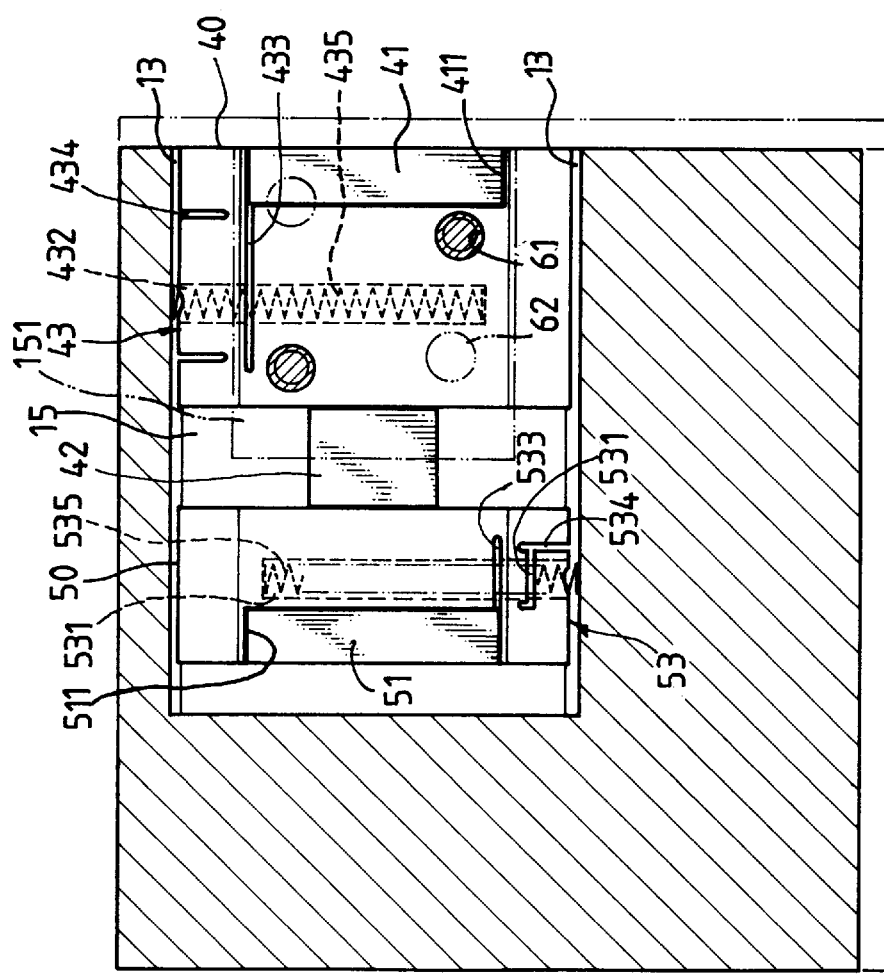
FIG. 4 is a cross-sectional view taken along lines 4—4 of FIG. 1.
Figure 5:
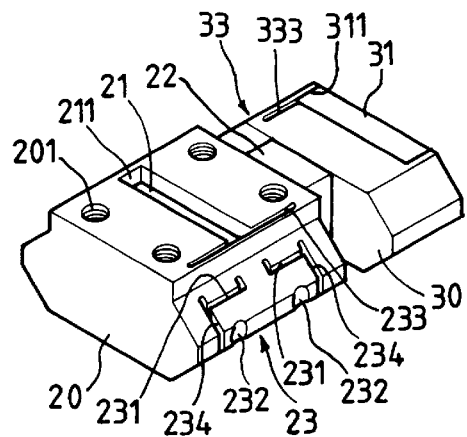
FIG. 5 a perspective view of a first and a second driving units of this invention being coupled to piezo-electric elements.

As illustrated in FIGS. 3 and 4, the first and the second driving units 20, 30 may be formed with openings 232, 332 on a side thereof for receiving springs 235, 335 of appropriate expansion force such that the springs 235, 335 urge against the guides 12 and cause the first and the second driving units 20, 30 to maintain appropriate bond with the guides 12 and to steadily slide within the guides 12 despite of any gap therebetween that causes rocking.

Furthermore, another side of the bed, such as the side that is perpendicular to the side for receiving the first and the second driving units 20, 30, is formed with a second positioning groove 15 having a top opening 151 and a front opening 152. The second positioning groove 15 includes opposing sides being formed with V-shaped guides 13 for receiving a third driving unit 40 and a fourth driving unit 50. The third driving unit 40 and the fourth driving unit 50 are formed with a chamber 411, 511 at a front end and rear end, respectively, for being adhered to and receiving piezo-electric elements 41, 51. A piezo-electric element 42 is firmly adhered to a rear end of the third driving unit 41 and front end of the fourth driving unit 50. The third driving unit 40 is formed on top thereof with threaded openings 44 for adapting to threaded openings 61 of a tool rest 60 such that the tool rest 60 is threaded and secured to the top of the third driving unit 40 via bolts (not shown). The tool rest 60 is further formed with openings 62 for securing a tool (not shown).

Operations of the third and the forth driving units 40, 50 are substantially similar to those illustrated in FIG. 6 and described above. That is, voltages are first applied to the piezo-electric element 51 to cause expansion of both sides of the fourth driving unit 50 So as to urge against the guides 13. Voltages are then applied to the piezo-electric element 42 to cause expansion thereof so as to subject the third driving unit 40 to move a minute distance forwards. Voltages being applied to the piezo-electric element 51 are then removed to cause the fourth driving unit 50 to release from the guides 13. Voltages are then applied to the piezo-electric element 41 to cause expansion of both sides of the third driving unit 40 so as to urge against the guides 13 for positioning purpose. Voltages being applied to piezo-electric element 42 is finally removed to cause contraction of the piezo-electric element 42, thereby subjecting the fourth driving unit 50 to move a minute distance forwards. Voltages are applied to or removed from the piezo-electric elements 41, 42, 52 in accordance with such sequences to cause alternating expansion or contraction of-the third and the fourth driving units 40 so as to cause forward or rearward movement.

A positioning flatbed assembly of precise positioning and movement is constructed based on the fore-described construction of the first driving unit 20 and the second driving unit 30 in accompany with the disposition of the piezo-electric elements; a workpiece (not shown) may be secured on the first driving unit 20. Furthermore, the third driving unit 40, the forth driving unit 50, and the piezo-electric elements 41, 42, 51 also construct a movable positioning flatbed assembly such that a tool rest 60 may be secured on the third driving unit 40 so as to jointly form a positioning flatbed of minute increments in two axial directions for machining purposes.

Figure 7:
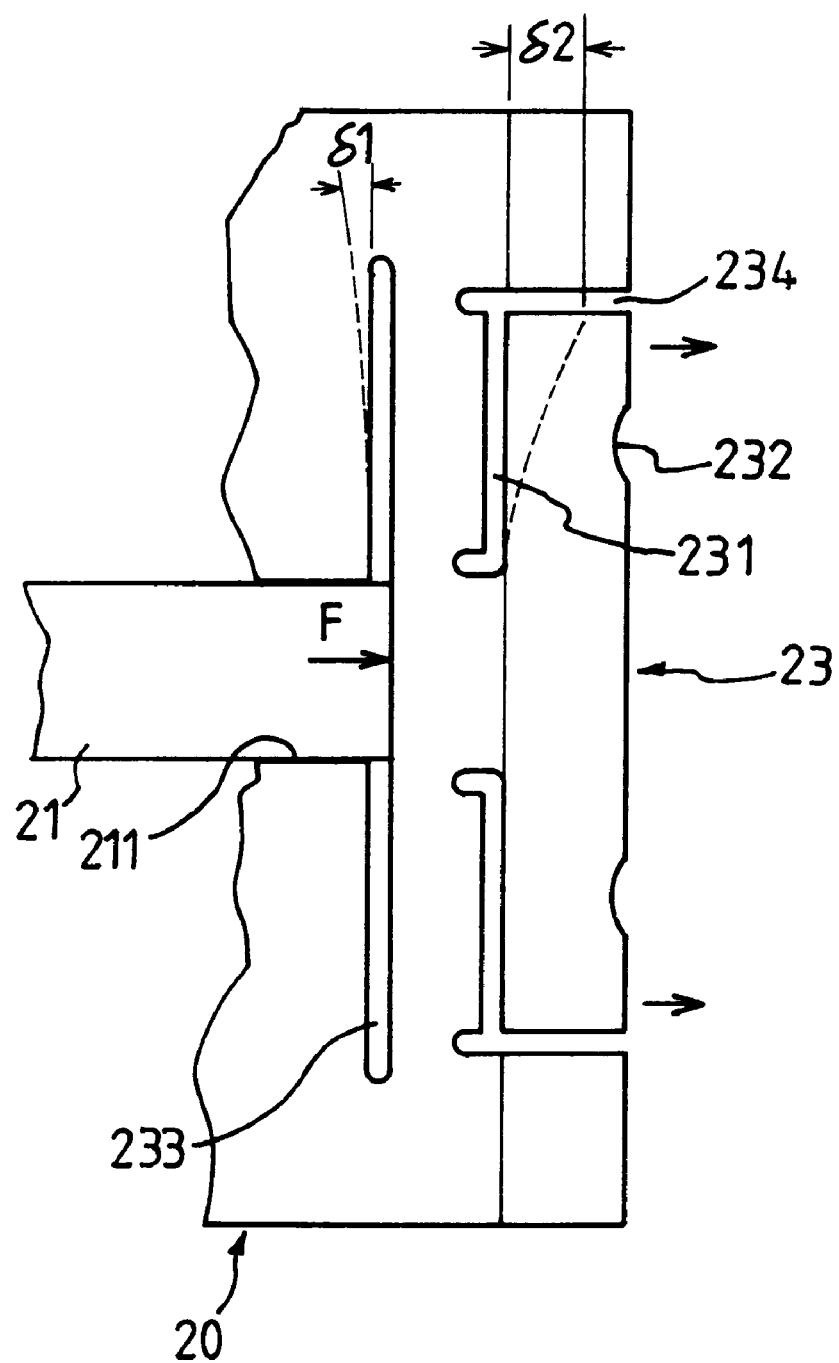
FIG. 7 is a resilience structural schematic view of the driving units of this invention.
Figure 8A:
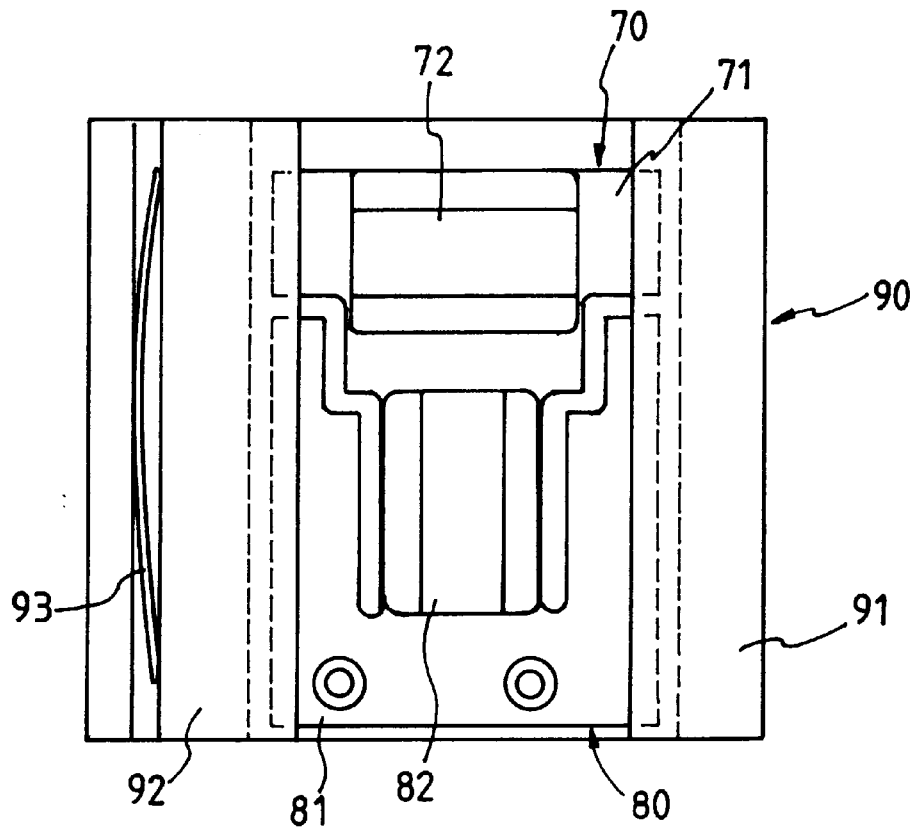
FIG. 8A is a top structural schematic view of an X-Y driving unit of prior "Micro-Lathe"
Figure 8B:
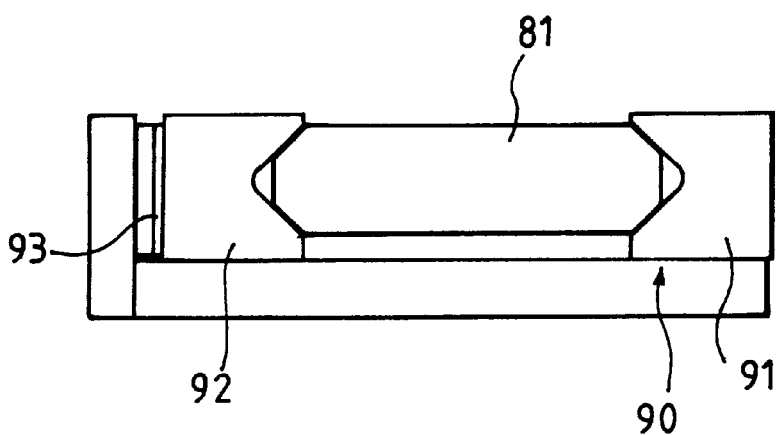
FIG. 8B is a front elevational structural schematic view of an X-Y driving unit of prior "Micro-Lathe".

In addition, FIG. 7 illustrates reaction of the first driving unit 20 while being subjected to expansion of the piezo-electric element 21. To enhance strain of each driving unit while being subjected to expansion force of a relevant piezo-electric element, a resilient zone 23 is provided between an end of the chamber 211 for receiving the piezo-electric element 21 and a side of the first driving unit 20. That is, the first driving unit 20 is formed with a penetrating first slit 233 of an appropriate length extending from the rear end of the chamber 211 along a direction substantially parallel to the side of the first driving unit 20. The first driving unit 20 is further formed with a substantially parallel, penetrating second slit 231 between the first slit 233 and the side of the first driving unit 20. The first driving unit 20 is further formed with a penetrating third slit 234 that extends to the side of the driving unit 20 at an end of the second slit 231 and that is distant from center of the driving unit 20. Hence, when voltages are applied to the piezo-electric element 21 to cause expansion towards the side of the first driving unit 20 and the piezo-electric element 21 exerts a force F upon the first driving unit 20, a neighboring side of the first slit 233 flexes towards a reverse direction of the side of the first driving unit 20 and produces strain δ1, to cause a neighboring side of the first driving unit 20 flexing towards the side of the first driving unit 20 and producing strain δ2, whereby resilient effect resulted from the expansion of the piezo-electric element 21 is enhanced. As illustrated in FIG. 7, implementing such a construction disclosed in this invention produces accurate positioning effect resulted from urging action of the first driving unit 20 against the guides 12. Implementing such a construction to urge elements that are in contact with each other, enhances a larger pushing thrust against the contacted element.

Based on the foregoing concept of providing a resilient zone 23 at the first driving unit 20, the second driving unit 30 may also be provided with a resilient zone 33. Similarly, the resilient zone 33 is formed of a first slit 333, a second 331, and a third slit 334. Furthermore, the third driving unit 40 is provided with a resilient zone 43 formed of a first slit 433, a second slit 431, and a third slit 434. The fourth driving unit is provided with a resilient zone 53 formed of a first slit 533, a second slit 531, and a third slit 534.

Furthermore, the housing 11 of the bed 10 may be formed with a plurality of threaded openings at appropriate locations for securing a rigid seal plate that enhances rigidity of the bed 10 and prevents separation of components, such as the driving units.

In summary, the micro-positioning flatbed of this invention primarily relates to providing guides 12, 13 within the bed 10 for supporting movement of the driving units 20, 30, 40, 50, wherein the first and the second driving units 20, 30 form a set and the third and the fourth driving units 40, 50 form a set. Each set causes alternating urging action against relevant guides due to strains resulted from expansion and contraction of relevant piezo-electric elements within the driving units so as to attain precise positioning and movement. Furthermore, each of the driving unit of this invention is provided with a resilient zone to enhance the flexing and straining effect thereof.

Aforementioned explanations, however, are directed to the description of preferred embodiments according to this invention. Various changes and implementations, such as locations of the piezo-electric elements within the driving units, numbers of driving unit set, locations of the driving units on the bed, or configurations, locations, and corresponding numbers of slits of the resilient zone of the driving unit, can be made by those skilled in the art without departing from the technical concept of this invention. Since this invention is not limited to the specific details described in connection with the preferred embodiments except hose that may be within the scope of the appended claims, changes to certain features of the preferred embodiments without altering the overall basic function of the invention are contemplated.

What is claimed is:

1. A micro-positioning flatbed, comprising:
    a bed having a housing being formed with a positioning groove at a predetermined location, the positioning groove having opposed sides being formed with guides;
    a resilient first driving unit being formed with a penetrating chamber therein, the chamber having opposing sides configured to correspond to the guides of the bed for assembling the first driving unit in the guides of the bed;

a resilient second driving unit being formed with a penetrating chamber therein, the chamber having opposing sides configured to correspond to the guides of the bed for assembling the second driving unit in the guides of the bed in alignment with the first driving unit;

a plurality of piezo-electric elements being firmly received in the chambers of the first and the second driving units, and between adjacent ends of the first and the second driving units for firmly coupling the first and the second driving units;

wherein the first and the second driving units are each formed with an opening of a predetermined depth on a side thereof;

a spring provided in the opening of the first and the second driving units to allow the first and the second driving units to maintain appropriate bond with the guides;

whereby each piezo-electric element is controlled by voltages so as to sequentially generate alternate expansion and contraction which cause the first and the second driving units to expand and contract, respectively, thereby causing the first and the second driving units to urge against and release from the guides so as to achieve effects of precise positioning and continuous micro-motion.

2. The micro-positioning flatbed as set forth in claim 1, wherein the guides of the bed each have a V-shaped configuration along a lateral cross-section thereof, and the opposing sides of the first and the second driving units are each formed with a corresponding V-shaped configuration.

3. The micro-positioning flatbed as set forth in claim 1, wherein the first driving unit is formed with threaded openings on top thereof for retaining a workpiece.

4. A micro-positioning flatbed, comprising:
   a bed having a housing being formed with a positioning groove at a predetermined location, the positioning groove having opposed sides being formed with guides;
   a resilient first driving unit being formed with a penetrating chamber therein, the chamber having opposing sides configured to correspond to the guides of the bed for assembling the first driving unit in the guides of the bed;
   a resilient second driving unit being formed with a penetrating chamber therein, the chamber having opposing sides configured to correspond to the guides of the bed for assembling the second driving unit in the guides of the bed in alignment with the first driving unit;
   a plurality of piezo-electric elements being firmly received in the chambers of the first and the second driving units, and between adjacent ends of the first and the second driving units for firmly coupling the first and the second driving units;
   wherein the first driving unit has at least a side being provided with a resilient zone which enhances an expansion strain of the side in response to a force resulted from an expansion of the piezo-electric element received in the first driving unit and exerted on the side; and
   the resilient zone is formed between a rear end of the chamber and a side of the first driving unit adjacent the chamber;
   further wherein the resilient zone comprises a penetrating first slit of an appropriate length extending from the rear end of the chamber along a direction substantially parallel to the side of the first driving unit; a penetrating second slit between the first slit and the side of the first driving unit; and a penetrating third slit that extends to the side of the first driving unit at an end of the second slit that is distant from center of the first driving unit.

5. The micro-positioning flatbed as set forth in claim 1, wherein the second driving unit has at least a side being provided with a resilient zone that enhances expansion strain of the side in response to a force resulted from expansion of the piezo-electric element received in the second driving unit and exerted on the side.

6. The micro-positioning flatbed as set forth in claim 5, wherein the resilient zone is formed between a rear end of the chamber and a side of the second driving unit adjacent the chamber.

7. A micro-positioning flatbed, comprising:
   a bed having a housing being formed with a plurality of positioning grooves at predetermined locations along different axial directions, each of the positioning grooves having opposing sides being formed with guides;
   a plurality of driving sets, at least one driving set comprising a first driving unit and a second driving unit that are in alignment, and at least one other driving set comprising a third driving unit and a fourth driving unit that are in alignment, wherein the driving units are each configured to correspond to the corresponding guides to the bed for assembling the driving units in the corresponding guides;
   a plurality of piezo-electric elements being firmly received in chambers formed in the first and the second driving units, between adjacent ends of the first and the second driving units for firmly coupling the first and the second driving units; chambers formed in the third and the fourth driving units, and between adjacent ends of the third and the fourth driving units for firmly coupling the third and the fourth driving units;
   wherein the first, the second, the third, and the fourth driving units are each formed with an opening of an appropriate depth on a side thereof;
   a spring provided in the opening of the driving units to allow the driving units to maintain appropriate bond with the guides;
   whereby each piezo-electric element is controlled by voltages so as to sequentially generate alternate lateral expansion and contraction which cause the first, the second, the third, and the fourth driving units to expand and contract, respectively, thereby causing the first, the second, the third, and the fourth driving units to urge against and release from the corresponding guides so as to achieve effects of precise positioning and continuous micro-motion.

8. The micro-positioning flatbed as set forth in claim 7, wherein the guides of the bed each have a V-shaped configuration along a lateral cross-section thereof, and the opposing sides of the first, the second, the third, and the fourth driving units are each formed with a corresponding V-shaped configuration.

9. The micro-positioning flatbed as set forth in claim 7, wherein the first driving unit is formed with threaded openings on top thereof for retaining a workpiece.

10. A micro-positioning flatbed, comprising:
    a bed having a housing being formed with a plurality of positioning grooves at predetermined locations along different axial directions, each of the positioning grooves having opposing sides being formed with guides;

a plurality of driving sets, at least one driving set comprising a first driving unit and a second driving unit that are in alignment, and at least one other driving set comprising a third driving unit and a fourth driving unit that are in alignment, wherein the driving units are each configured to correspond to the corresponding guides to the bed for assembling the driving units in the corresponding guides;

a plurality of piezo-electric elements being firmly received in chambers formed in the first and the second driving units, between adjacent ends of the first and the second driving units for firmly coupling the first and the second driving units; chambers formed in the third and the fourth driving units, and between adjacent ends of the third and the fourth driving units for firmly coupling the third and the fourth driving units;

wherein each driving unit has at least a side being provided with a resilient zone which enhances expansion strain of the side in response to a force resulted from expansion of the piezo-electric element received in each driving unit and exerted on the side;

further wherein the resilient zone comprises a penetrating first slit of an appropriate length extending from the rear end of the chamber along a direction substantially parallel to the side of the driving unit; a penetrating second slit between the first slit and the side of the driving unit; and a penetrating third slit that extends to the side of the driving unit at an end of the second slit that is distant from a center of the driving unit.

11. The micro-positioning flatbed as set forth in claim 10, wherein the resilient zone is formed between a rear end of the chamber and a side of the driving unit adjacent the chamber.

* * * * *